Aug. 22, 1933.   A. S. HOWELL   1,923,376
INTERCHANGEABLE LENS MOUNT STRUCTURE
Filed April 2, 1931
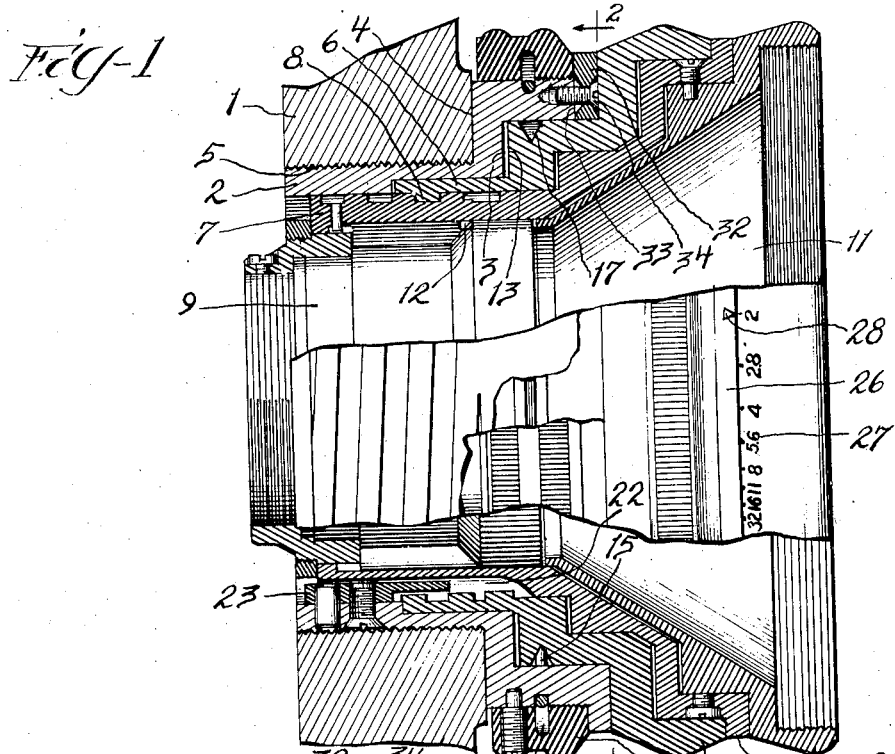
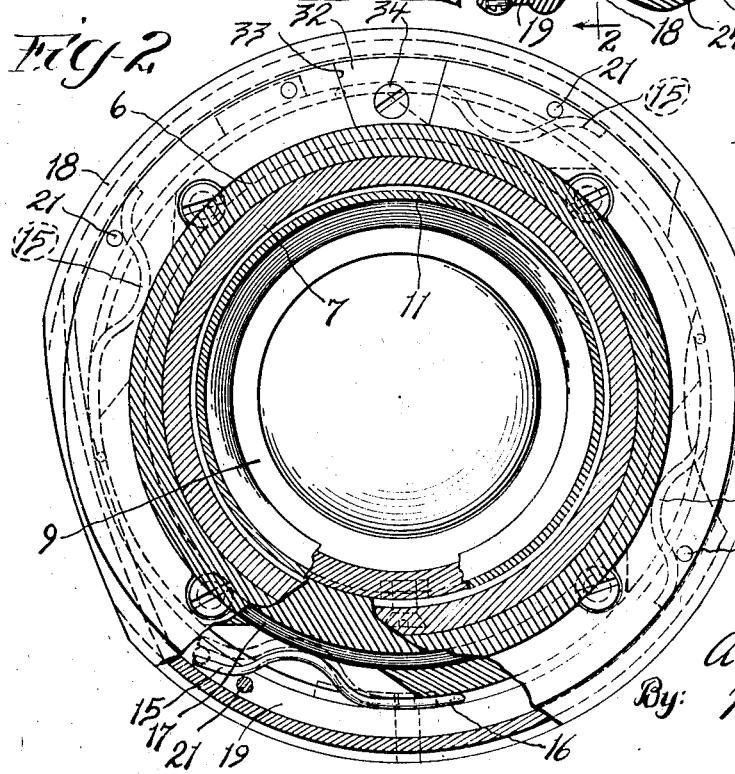
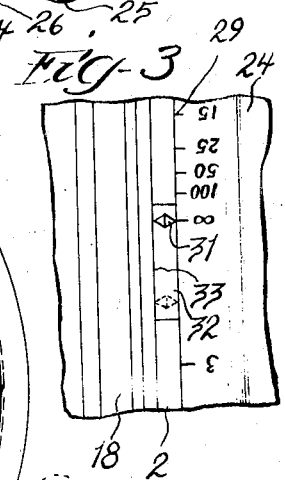
Inventor
Albert S. Howell
By: Mehle & Miehle
Attys Patented Aug. 22, 1933

1,923,376

UNITED STATES PATENT OFFICE 1,923,376

INTERCHANGEABLE LENS MOUNT STRUCTURE

Albert S. Howell, Chicago, Ill., assignor to The Bell & Howell Company, Chicago, Ill., a Corporation of Illinois Application April 2, 1931. Serial No. 527,100

11 Claims. (Cl. 95—45)

My invention relates particularly to a photographic lens mount structure although not limited to this use alone.

The invention has for its general object the provision of a novel, effective and convenient interchangeable lens mount structure by means of which lenses may be quickly and conveniently interchanged and which provides for the focusing of the lenses.

With this object in view my invention consists in certain features of novelty in the construction, combination and arrangement of parts by which the said object and certain other objects, hereinafter appearing, are effected, all as fully described with reference to the accompanying drawing and more particularly pointed out in the appended claims.

In the said drawing—

Figure 1 is an axial section, with portions shown in elevation, of an interchangeable lens mount structure embodying my invention;

Figure 2 is a sectional view substantially on the line 2—2 of Figure 1; and

Figure 3 is a top plan view of a portion of the structure.

Like characters of reference indicate like parts in the several views.

Referring to the drawing, 1 designates a support element, such as the casing of a photographic camera, and a bushing 2, reduced at its rear portion and forming thereby oppositely facing interior and exterior shoulders 3 and 4, has external screwthreads 5 on its rear portion by means of which the bushing is screwthreaded into a bore through the support element with the exterior shoulder 4 of the busing abutting the support element. See Figure 1. The bushing 2 forms an adaptor for the conventional photographic lens mount aperture of cameras and as so mounted is not disturbed in the interchange of lenses as hereinafter described.

The interchangeable lens unit of my invention is engageable rearwardly in the bore of the bushing 2 and consists as follows.

A focus adjusting bushing 6 has a lens carrying bushing 7 engaged therein for relative angular and axial movement and has a rearwardly disposed adjusting screwthread engagement 8 therewith whereby angular movement of the bushing 6 effects axial movement of the lens bushing 7 for focusing. The lens carrying bushing 7 has a lens 9 secured in the rear portion of the bore thereof, and an iris adjusting bushing 11 is mounted within the forward portion of the lens carrying bushing for angular movement with respect thereto and is operatively connected with the usual iris mechanism of the lens 9, as indicated at 12.

The lens unit thus formed has its rear portion reduced to engage in the reduced rear portion of the bore of the bushing 2, the rear portion of the focus adjusting bushing 6 being correspondingly reduced and forming a rearwardly facing shoulder 13 opposing the forwardly facing interior shoulder 3 of the bushing 2.

Arranged in openings 14 in the enlarged forward portion of the bushing 2 and angularly spaced thereabout are a plurality of locking springs 15, corresponding end portions of which are secured with this bushing as designated at 16. See Figures 1 and 2. The free portions of the springs 15 are movable to engage in a circumferential groove 17 on the bushing 6 just forward of the shoulder 13 thereof, to lock the lens unit in the bushing 2 and axially fix the bushing 6 therewith and permit relative angular movement thereof, and to disengage from said groove to permit removal of the lens unit.

The springs 15 have a normal position out of engagement with the groove 17, and a ring 18 is mounted for angular movement on the exterior of the large forward portion of the bushing 2 and has an internal groove 19 into which the free ends of the springs 15 project. Pins 21, on the ring 18 and spaced angularly thereabout, extend across the groove 19 for engagement with the free ends of the springs to effect simultaneous locking and unlocking movement of the springs with opposite angular movements of the ring, thus providing a locking engagement with the bushing 6 extending angularly about the same which is conveniently controlled.

The lens carrying bushing 7 projects rearwardly from the focus adjusting bushing 6 and is provided with an exterior axially extending keyway 22 open at the rear end thereof. See Figure 1. A key 23 is secured in the bore of the bushing 2 to the rear of the bushing 6 and slidably engages the keyway 22, to angularly fix the lens carrying bushing 7 with the bushing 2, the open rear end of the keyway permitting engagement and disengagement of the key with the keyway in the mounting and dismounting of the lens unit.

Thus, the focus adjusting bushing 6 is axially fixed with the bushing 2 and is angularly movable with reference thereto and the lens carrying bushing 7 is angularly fixed with the bushing 2 and is axially movable with reference thereto.

Accordingly, when the lens unit is mounted on the bushing 2, angular movement of the focus adjusting bushing 6 effects axial or focusing movement of the lens carrying bushing 7 for focusing the lens 9 by reason of the functioning of the screwthread engagement 8 between the bushing 6 and 7.

Thus it will be observed that the lens unit is quickly and conveniently mounted and dismounted, the adjusting screwthread engagement being part of the lens unit and the bushing 2 being the stationary intermediary between the two bushings 6 and 7.

The three bushings 6, 7 and 11 enlarge forwardly of the bushing 2, as will be seen in Figure 1, and the bushings 6 and 11 terminate forwardly with manipulating ring portions 24 and 25 respectively while the bushing 7 terminates forwardly with a circumferential surface portion 26 interposed between the ring portions 24 and 25, this forward enlargement of the bushings providing for the angle of the lens 9 and providing a desirable diameter of the forward portions of these bushings.

Indexing means is provided for said iris adjusting bushing 11 and comprises a scale 27 on the manipulating ring portion 25 and extending angularly thereon and a cooperating index mark 28 on the circumferential surface portion 26 of the lens carrying bushing 7. See Figure 1.

Indexing means is also provided for said focus adjusting bushing 6 and comprises a scale 29 on the manipulating ring portion 24 and extending angularly thereon and a cooperating index mark 31 on a block 32 secured in a recess 33 in the front end of the bushing 2 by means of a headed screw 34. See Figures 1, 2 and 3. The block 32 is reversible in the recess and the index mark 31 is disposed in off center position on the block so that reversing of the block effects shifting of the index mark, as indicated in Figure 3, to accommodate cameras having focal planes spaced differently with reference to the surface thereof engaged by the shoulder 4 of the bushing 2.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with a lens mount formation, of a lens unit mountable on said mount formation and comprising a lens member and an adjusting member angularly and axially movable with reference thereto and having axial adjusting screwthread engagement therewith, means axially fixing said adjusting member on said mount formation and permitting relative angular movement thereof and releasable for lens unit removal, and means angularly fixing said lens carrying member with said mount formation and permitting relative axial movement thereof and disengageable for lens unit removal.

2. In a device of the character described the combination with a bore formation, of a lens unit engageable in said bore formation and comprising a lens member and an adjusting bushing within which said lens member is engaged for relative angular and axial movement and having axial adjusting screwthread engagement therewith, means axially fixing said adjusting member with said bore formation and permitting relative angular movement thereof and releasable for lens unit removal, and an axially extending sliding engagement between said lens member and said bore formation angularly fixing the same and disengageable for lens unit removal.

3. In a device of the character described the combination with a bore formation, of a lens unit engageable rearwardly into said bore formation and comprising a lens member and an adjusting bushing within which said lens member is engaged for relative angular and axial movement and having axial adjusting screwthread engagement therewith, forwardly disposed means axially fixing said adjusting bushing with said bore formation and permitting relative angular movement thereof and releasable for lens unit removal, and rearwardly disposed means angularly fixing said lens carrying member with said bore formation and permitting relative axial movement thereof and disengageable for lens unit removal.

4. In a device of the character described the combination with a bore formation, of a lens unit engageable rearwardly into said bore formation and comprising a lens member and an adjusting bushing within which said lens member is engaged for relative angular and axial movement and having axial adjusting screwthread engagement therewith, said lens member projecting rearwardly from said adjusting bushing and provided with an exterior axially extending keyway open at the rear end thereof, a key in the bore of said bore formation and slidably engaging said keyway to angularly fix said lens member with said bore formation, and forwardly disposed means axially fixing said adjusting bushing on said bore formation and permitting relative angular movement thereof and releasable for lens unit removal.

5. In a device of the character described the combination with a bore formation, of a lens unit engageable rearwardly into said bore formation and comprising a lens member and an adjusting bushing within which said lens member is engaged for relative angular and axial movement and having axial adjusting screwthread engagement therewith, said lens member projecting rearwardly from said adjusting bushing and provided with an exterior axially extending keyway open at the rear end thereof, a key secured in the bore of said bore formation and slidably engaging said keyway to angularly fix said lens member with said bore formation, a plurality of locking members spaced angularly about the forward portion of said bore formation and movable to engage said adjusting bushing to axially fix said adjusting bushing with said bore formation and permitting relative angular movement thereof and movable to disengage from said adjusting bushing for lens unit removal, a manually operable ring mounted for angular movement forwardly on said bore formation and surrounding said lens unit, and means whereby angular movement of said ring relative to said bore formation effects simultaneous engaging and disengaging movement of said locking members.

6. In a device of the character described the combination with a bore formation, of a lens unit engageable in said bore, a ring mounted for angular movement on the exterior of said bore formation, a plurality of locking springs on said bore formation and spaced angularly thereabout and movable to engage in a circumferential groove on said lens unit to lock said lens unit on said bore formation and having a normal position out of engagement therewith, and formations on said ring engageable with said springs whereby angular movement of said ring relative to said bore formation effects simultaneous locking and unlocking movement of said springs.

7. In a device of the character described the combination with a bushing reduced at its rear portion and forming thereby oppositely facing interior and exterior shoulders and having external screwthreads on said rear portion for the mounting of the bushing, of a lens unit engageable in said bore and having its rear portion correspondingly reduced to engage in the rear portion of the bore of said bushing and forming a shoulder opposing the interior shoulder of said bushing, a manually operable ring mounted for angular movement on the forward portion of said bushing and surrounding said lens unit, a plurality of locking members spaced angularly about the forward portion of said bushing and movable to engage said lens unit forwardly of said shoulder thereof to lock said lens unit on said bore formation and movable to disengage from said lens unit, and means whereby angular movement of said ring relative to said bore formation effects simultaneous engaging and disengaging movement of said locking members.

8. In a device of the character described the combination with a bore formation, of a lens unit interchangeably mountable rearwardly therein and comprising a focus adjusting bushing angularly movable with reference to said mount formation, an angularly fixed lens carrying bushing within said focus adjusting bushing and with reference to which said focus adjusting bushing is angularly movable and in iris adjusting bushing within said lens carrying bushing and angularly movable with reference thereto, said focus and iris adjusting bushings being provided with forward manipulating ring portions and said lens bushing having a forward circumferential surface portion interposed between said ring portions, indexing means for said iris adjusting bushing comprising cooperating markings on said manipulating ring of said iris adjusting bushing and said circumferential surface portion of said lens bushing, and a second index means for said focus adjusting bushing comprising a scale on said manipulating ring of said focus adjusting bushing and a cooperating index mark fixed with said bore formation.

9. In a device of the character described the combination with a bore formation, of a lens unit interchangeably mountable rearwardly therein and comprising a focus adjusting bushing angularly movable with reference to said mount formation, an angularly fixed lens carrying bushing within said focus adjusting bushing and with reference to which said focus adjusting bushing is angularly movable and an iris adjusting bushing within said lens carrying bushing and angularly movable with reference thereto, said three bushings enlarging forwardly of said bore formation, said focus and iris adjusting bushings terminating forwardly with manipulating ring portions and said lens bushing terminating forwardly with a circumferential surface portion interposed between said ring portions, indexing means for said iris adjusting ring comprising cooperating markings on said manipulating ring of said iris adjusting bushing and said circumferential surface portion of said lens bushing, and a second index means for said focus adjusting bushing comprising a scale on said manipulating ring of said focus adjusting bushing and a cooperating index mark fixed with said bore formation.

10. In a device of the character described the combination with a lens mount formation, of a lens unit interchangeably mountable on said mount formation and including an adjusting member angularly movable with reference to said mount formation, and index means for said adjusting member including an index element on said mount formation and provided with an index mark and means whereby said index mark element is predeterminately changeable on said mount formation to shift said index mark.

11. In a device of the character described the combination with a bored formation, of a lens unit interchangeably mountable in said bore formation including an adjusting member engaged in said formation for angular movement and provided with an exposed external annular portion at one end of said formation and having an angularly extending index scale on said annular portion, and an index block engaged in a recess in said end of said bored formation and reversible therein and provided with an index mark for cooperation with said scale, said index mark being disposed in off center position on said block whereby reversal of said block effects shifting of said index mark, and means for securing said block in either of its said positions.

ALBERT S. HOWELL.